United States Patent
Yamaguchi et al.

(10) Patent No.: US 6,487,303 B1
(45) Date of Patent: Nov. 26, 2002

(54) OBJECT DETECTOR

(75) Inventors: Hiroyoshi Yamaguchi, Hiratsuka (JP); Tetsuya Shinbo, Hiratsuka (JP); Osamu Yoshimi, Hiratsuka (JP); Seiichi Mizui, Odawara (JP)

(73) Assignee: Komatsu Ltd. (JP)

( * ) Notice: Subject to any disclaimer, the term of this patent is extended or adjusted under 35 U.S.C. 154(b) by 0 days.

(21) Appl. No.: 09/284,619

(22) PCT Filed: Nov. 6, 1997

(86) PCT No.: PCT/JP97/04043

§ 371 (c)(1),
(2), (4) Date: Jun. 15, 1999

(87) PCT Pub. No.: WO98/20455

PCT Pub. Date: May 14, 1998

(30) Foreign Application Priority Data

Nov. 6, 1996 (JP) .............................. 8-293993

(51) Int. Cl.$^7$ ................................. G06K 9/00
(52) U.S. Cl. ...................... 382/103; 382/108
(58) Field of Search ................ 382/103, 104, 382/224, 154, 291, 209, 276, 107, 108; 356/4.01, 5.01, 394; 348/169, 143, 147; 345/428, 419, 421, 422

(56) References Cited

U.S. PATENT DOCUMENTS 4,862,357 A * 8/1989 Ahlstrom et al. ........... 364/407
5,644,386 A * 7/1997 Jenkins et al. ............. 356/4.01
5,974,158 A * 10/1999 Auty et al. ................. 382/103
6,173,066 B1 * 1/2001 Peurach et al. ............. 382/103

FOREIGN PATENT DOCUMENTS

| JP | 552934 | 3/1993 |
| JP | 5282430 | 10/1993 |
| JP | 7320199 | 12/1995 |
| JP | 8184417 | 7/1996 |

* cited by examiner

Primary Examiner—Leo Boudreau
Assistant Examiner—Seyed Azarian
(74) Attorney, Agent, or Firm—Greer, Burns & Crain, Ltd.

(57) ABSTRACT

In the device according to the present invention, it is possible readily to distinguish between a road of travel and an obstacle in an image, simply using a distance image, even in cases where such a distinction is difficult to make, for instance, when a moving body is inclined during travel or the road forms a slope.

Three-dimensional co-ordinate position data in a three-dimensional co-ordinate system is calculated for each pixel of the distance image, on the basis of two-dimensional co-ordinate position data for each pixel in the distance image and distance data from a reference position for each of the pixels, in such a manner that a three-dimensional distribution of pixels corresponding to a plane and an object to be detected is generated. Therefore, the object to be detected corresponding to groups of pixels having a prescribed height or more with respect to this plane can be distinguished readily from groups of pixels corresponding to the plane, on the basis of this three-dimensional distribution of pixels.

12 Claims, 7 Drawing Sheets

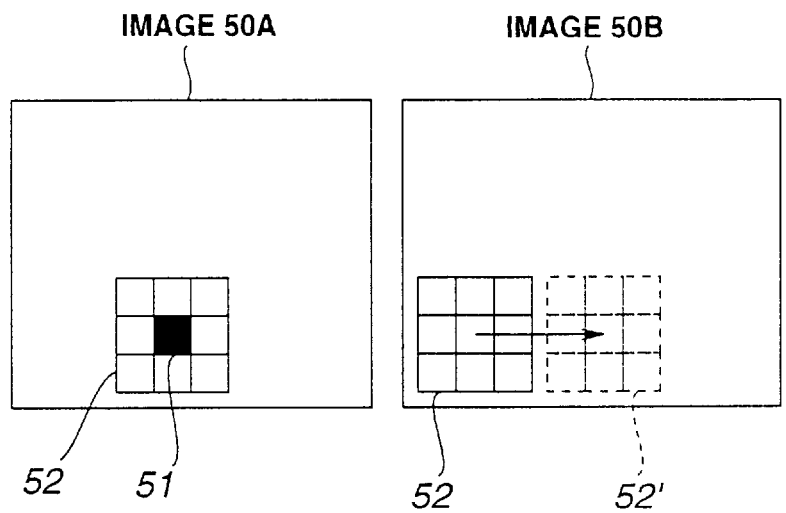
FIG.3(a)  FIG.(b)
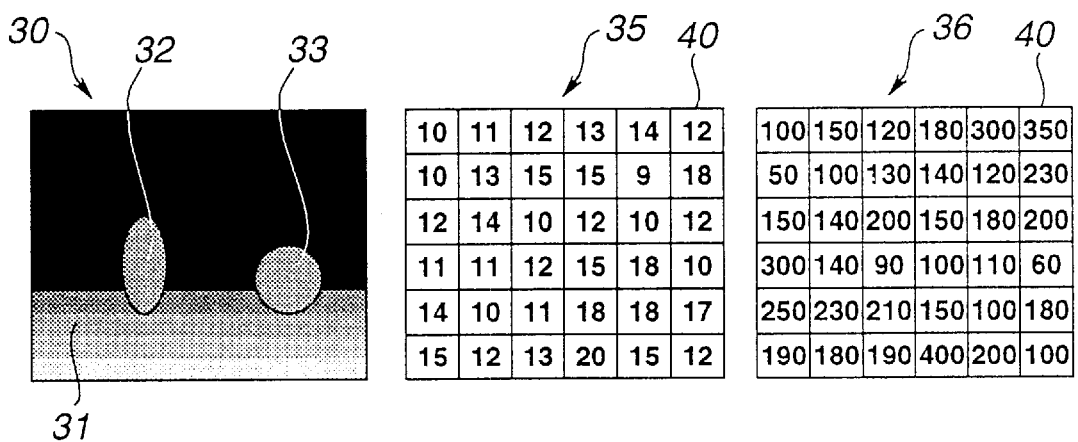
FIG.4(a)  FIG.4(b)  FIG.4(c)
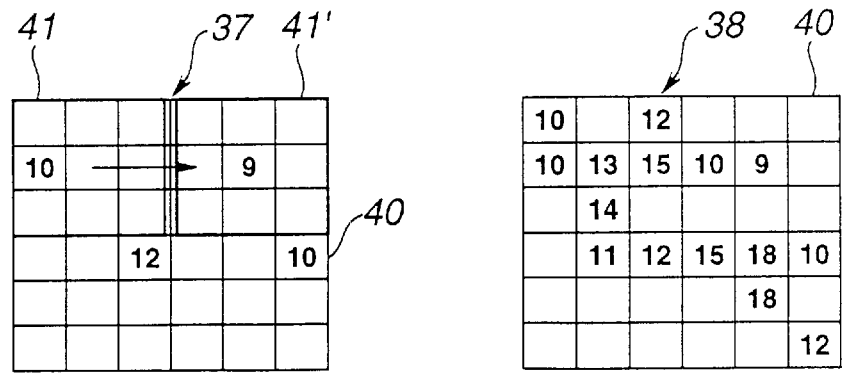
FIG.5(a)  FIG.5(b)

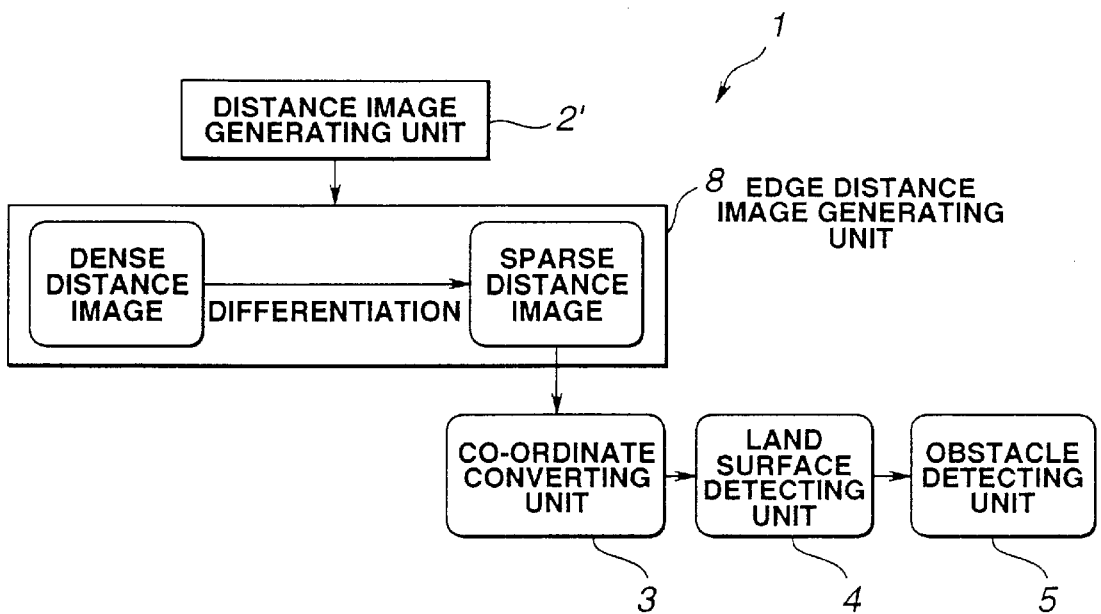
FIG.7
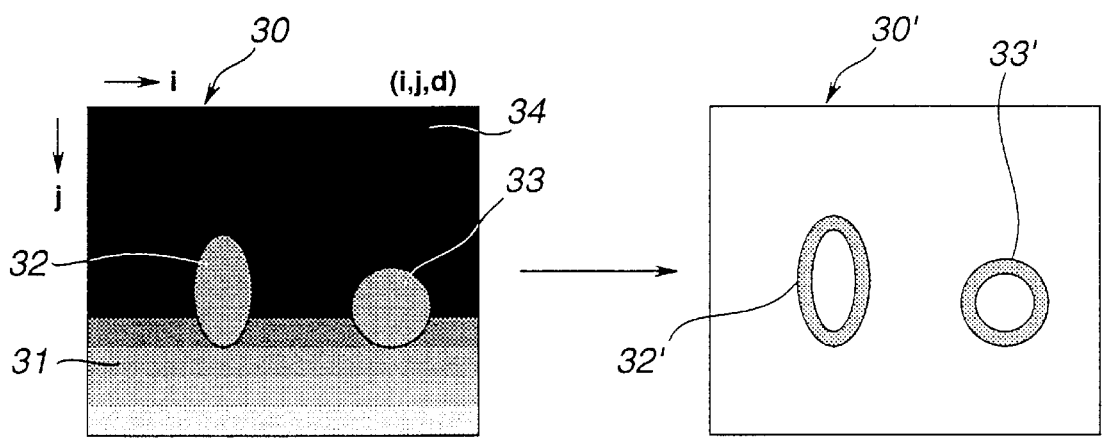
FIG.8(a)          FIG.8(b)

OBSTACLE 1 : WIDTH a 1m
HEIGHT b 0.5m
DEPTH c 0.5m
REPRESENTATIVE POINT g (1,0.25,5)

OBSTACLE 2 : WIDTH a 2m
HEIGHT b 1m
DEPTH c 1m
REPRESENTATIVE POINT g (-1,0.5,6)

OBJECT DETECTOR

TECHNICAL FIELD

The present invention relates to a device for detecting an object which is present on a plane, in particular, an obstacle present on the surface of the road of travel of a moving body, such as an unmanned dump truck, or the like.

BACKGROUND ART

At present, moving bodies, such as unmanned dump trucks, or the like, cannot be regarded as having adequate capability for detecting obstacles present on their road of travel. This is because a method is still used whereby obstacles in the forward direction of travel of a moving body are detected using ultrasonic sensors, laser readers, and millimeter-wave sensors, and when such a method is adopted, problems arise in that the range of detection of obstacles is restricted by the narrowness of field of vision, and only a small amount of information is obtained from the sensors.

On this point, if a method is adopted whereby images are gathered in the forward direction of the moving body and obstacles are detected by processing the images thus taken, merits are obtained in that the amount of information gathered is large, the field of view is broad and hence obstacles can be detected across a wide range.

There exist obstacle detectors based on image processing of this kind which are devised such that, by using a stereo camera (at least two cameras) and matching the pixels in the images captured by these two cameras on the basis of a pattern matching principle, a distance image comprising two-dimensional co-ordinate position information and information on the distance from a reference point on the moving body is generated, and the distance from the reference point on the moving body to the obstacle can be detected using this distance image.

A distance image of this kind may be a distance image having sparse pixels which comprises distance information for the outline regions of a detected object only, or a distance image having dense pixels which shows pixel information for the surface regions of the detected object as well as the outline regions thereof, and by differential processing of the dense distance image, the outline regions of the detected object only are displayed and a distance image having sparse pixels is obtained.

As a distance measuring device of this kind, it is possible to use the device disclosed in Japanese Patent Application Hei.7-200999 (title of the invention: "Object distance measuring device and shape measuring device"), which relates to the present applicants.

However, since the distance images used are viewed from the camera co-ordinates of a stereo camera mounted on the moving body, in cases where the moving body is inclined at a steep gradient during its travel or cases where the road of travel becomes a slope, the road itself may be photographed in a high position in the distance image, and in many instances, it becomes difficult to distinguish whether an object displayed in the distance image is the road itself or an object that is present on the road.

Moreover, the distance image may contain many mismatched points, and if the distance of an obstacle is detected by processing the image as it is, then the distance to the obstacle may be misdetected.

Furthermore, since the position of an obstacle with respect to a moving body changes progressively, it is desirable that image processing for detecting an obstacle is carried in a short time, in order that the position of the obstacle is displayed, and the like, in real time.

DISCLOSURE OF THE INVENTION

The present invention was devised with the foregoing in view, a first object thereof being to make it possible readily to discriminate between a road of travel and an obstacle in a distance image, even in cases where such discrimination is difficult, for instance, when a moving body is inclined during travel or when the road of travel thereof forms a slope.

It is a second object of the invention to make it possible to detect an obstacle accurately, even if is supposed that distance images contain many mismatched points.

It is a third object of the invention to compress processing time for detecting obstacles, in such a manner that the position of an obstacle can be detected, displayed, and the like, in real time.

The present invention can be applied not only to detecting obstacles on the road of travel of a moving body, but also to detecting all types of objects present on a plane.

Therefore, in order to achieve the first object described above, a first aspect of the present invention is an object detector comprising distance image generating means for measuring a distance from a reference position to an object to be detected present on a plane and generating a distance image of the plane and the object to be detected, and detecting means for detecting the object on the plane by using the distance image generated by the distance image generating means, characterized in that the object detector comprises: three-dimensional distribution generating means for calculating three-dimensional co-ordinate position data in a three-dimensional co-ordinates system, for each pixel of the distance image, on the basis of two-dimensional co-ordinate position data for each pixel of the distance image and distance data from the reference position for each of the pixels, and generating a three-dimensional distribution of pixels corresponding to the plane and the object to be detected; and detecting means for calculating a group of pixels corresponding to the plane on the basis of the three-dimensional distribution generated by the three-dimensional distribution generating means, and detecting groups of pixels having a prescribed height or more with reference to this calculated plane as the object to be detected.

A representative example of an object to be detected on the aforementioned plane is an obstacle on the surface of a road on which a moving body is travelling.

In other words, according to the first aspect of the invention, three-dimensional co-ordinate position data in a three-dimensional co-ordinate system is calculated for each pixel of a distance image, on the basis of two-dimensional co-ordinate position data for each pixel of the distance image and distance data from a reference position for each pixel, in such a manner that a three-dimensional distribution of pixels corresponding to a plane and the object to be detected is generated, and therefore the object to be detected corresponding to groups of pixels having a prescribed height or more with reference to the plane can be distinguished readily from the group of pixels corresponding to the plane, on the basis of this three-dimensional distribution. In other words, it is possible readily to distinguish between a road and obstacles in an image, simply by means of a distance image, even in cases where such a distinction is difficult to make, for instance, when the moving body is inclined during travel or when the path of travel is on a slope.

In order to achieve the second object described above, a second aspect of the present invention is the first aspect of the invention, characterized in that the distance image generating means generates the distance image by matching corresponding points of two images captured by two cameras, and when the three-dimensional distribution is generated by the three-dimensional generating means, pixels in the distance image obtained previously from the distance image generating means which show a matching error for the matching operation that is equal to or above a prescribed threshold value are regarded to be mismatched points and are removed.

In this way, according to the second aspect of the invention, even in cases where the distance image contains a large number of mismatched points, obstacles can be detected on the basis of the generated three-dimensional distribution after previously removing the mismatched points, and therefore misdetection of obstacles can be prevented and obstacles can be detected with good accuracy.

In order to achieve the third object described above, a third aspect of the present invention is the first aspect of the invention, characterized in that the distance image generating means generates the distance image of the object to be detected including a surface of the object, and when the three-dimensional distribution is generated by the three-dimensional distribution generating means, an edge distance image of the object to be detected representing only the edges of the object is obtained by differential processing of the distance image previously obtained from the distance image generating means, and the three-dimensional distribution is generated by using the edge distance image.

Alternatively, in the first aspect of the invention, the distance image generating means generates an edge distance image of the object to be detected representing only edges of the object, and the three-dimensional distribution generating means generates the three-dimensional distribution by using the edge distance image.

In this way, according to the third aspect of the invention, a dense distance image of the object to be detected including the surface of the object is converted to an edge distance image of the object representing only the edges of the object to be detected, or alternatively, an edge distance image of the object to be detected is generated by the distance image generating means, whereupon image processing for detecting obstacles is carried out on the basis of this edge distance image, and therefore it is possible broadly to reduce the number of pixels searched when processing the image, thereby significantly compressing the search time. In other words, the processing time for detecting obstacles is compressed, and hence processing, such as detecting and displaying obstacles, can be carried out in real time.

BRIEF DESCRIPTION OF THE DRAWINGS

FIGS. 3(a), (b) are diagrams for describing the principles of pattern matching;

FIGS. 4(a), (b), (c) are diagrams for describing processing for removing mismatched points from a distance image;

FIGS. 5(a), (b) are diagrams for describing processing for removing mismatched points from a distance image;

FIG. 7 is a block diagram showing a further embodiment of the present invention;

FIGS. 8(a), (b) are, respectively, a distance image having dense pixels and a edge distance image having sparse pixels;

BEST MODE FOR CARRYING OUT THE INVENTION

Below, an embodiment of the present invention is described with reference to the drawings.

In this embodiment, it is assumed that a moving body, such as an unmanned dump truck, or the like, is travelling along a road, and an obstacle, such as a rock, or the like, present on this road is detected by an obstacle detector mounted on the moving body.

Figure 1:
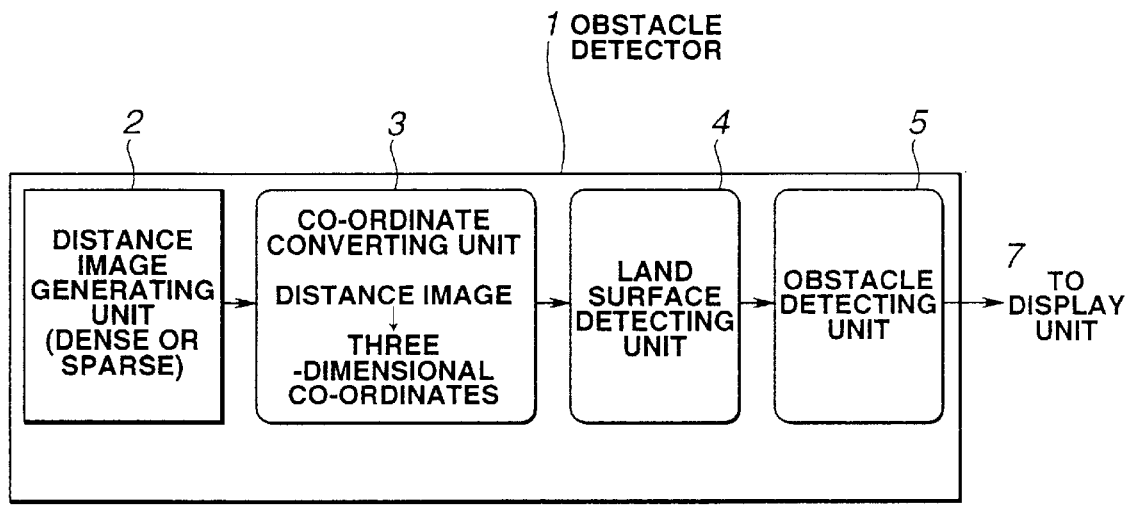
FIG. 1 is a block diagram showing an embodiment of an object detector relating to the present invention.

FIG. 1 shows the composition of an obstacle detector 1 premised on an embodiment of the present invention.

As shown in FIG. 1, this obstacle detector 1 comprises: a distance image generating unit 2 for measuring the distance from a reference point (reference face) on the moving body (not illustrated) to obstacles present on the road of travel of the moving body and generating a distance image of the road surface and the obstacles; a co-ordinates converting unit 3 for calculating three-dimensional co-ordinate position data in a three-dimensional co-ordinates system for each pixel of the distance image, on the basis of data on the distance from the aforementioned reference point for each pixel, and generating a three-dimensional co-ordinate position distribution for each pixel; a land surface detecting unit 4 for determining a group of pixels corresponding to the surface of the road by calculation on the basis of this three-dimensional distribution, thereby identifying and detecting the road surface (land surface); and an obstacle detecting unit 5 for detecting groups of pixels having a prescribed height or more with reference to this detected road surface as obstacles; the detection results being displayed on a display unit 7, consisting of a CRT display, or the like.

As illustrated in FIG. 8(a), the distance image generating unit 2 generates, for example, a distance image 30 comprising a road surface 31, two obstacles 32 (obstacle 1), 33 (obstacle 2), and a background 34. For each pixel 40 of this distance image 30, a two-dimensional co-ordinate position (i,j) in an i-j two-dimensional co-ordinates system is matched with data indicating a distance d from a reference point (reference face) on the moving body (i,j,d), and the pixel 40 at each position i,j of the distance image 30 has a brightness corresponding to the distance d. As a method for measuring distance in order to generate a distance image, it is possible, for example, to adopt a method using a multiple-eye lens (multiple-eye camera) as described in Japanese Patent Application Hei.7-200999 mentioned above.

FIG. 8(a) is a distance image 30 having dense pixels, wherein not only the outline regions, but also the surface regions of a road surface 31, obstacles 32, 33, and a background 34 are depicted with a prescribed brightness, and whilst the distance image generating unit 2 may generate a dense distance image 30 of this kind, it may also generate an edge distance image 30' having sparse pixels, wherein only the outline regions 32', 33' of the obstacles 32, 33 are depicted at a prescribed brightness, as shown in FIG. 8(b).

This edge distance image 30' may be generated directly by the distance image generating unit 2 in FIG. 1, but as illustrated in FIG. 7, it may also be generated by differential processing in an edge distance image generating unit 8 of the dense distance image 30 output by the distance image generating unit 2 for generating dense distance images. In the obstacle detector 1 in FIG. 7, a three-dimensional distribution of pixels is generated by three-dimensional co-ordinate conversion of the edge distance image 30' generated in the edge distance image generating unit 8 by means of the co-ordinates converting unit 3.

The aforementioned edge distance image 30' can be created by generating an image wherein the edges are emphasized, for example, by applying a Laplacian of Gaussian filter, Sobel operator, or the like, to the dense distance image 30 forming the original image, and then applying the brightness of the corresponding pixels in the original image to the pixels in the edge regions thus obtained (see FIGS. 8(a), (b)).

Figure 9:
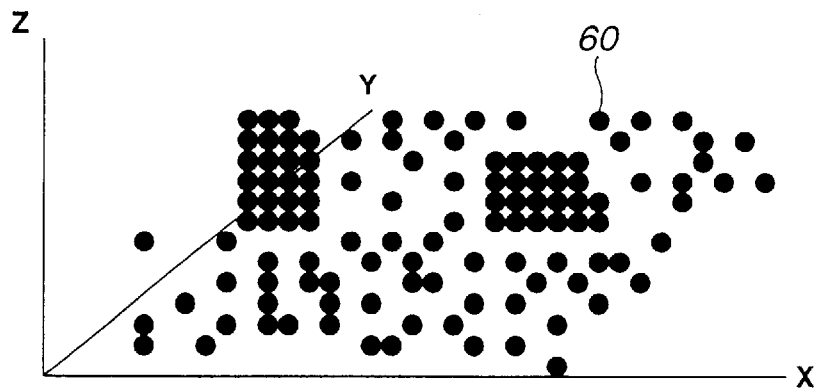
FIG. 9 is an oblique view showing the three-dimensional distribution of pixels in a distance image.

In the co-ordinates converting unit 3, taking the dense distance image 30 shown in FIG. 8(a) as an example, three-dimensional information (i,j,d) is matched to each pixel 40 of this distance image 30, as described above, and therefore each of the pixels 40 indicated by such distance image data (i,j,d) move with the moving body, as shown in FIG. 9, and can be converted respectively to pixels 60 which are matched to three-dimensional co-ordinate position data (X,Y,Z) in a vehicle co-ordinates system X-Y-Z having a point of origin at a prescribed position on the moving body. By carrying out a conversion of this kind, it is possible to obtain a distribution chart for the three-dimensional co-ordinate positions of each of the pixels 60. Here, the X axis is a co-ordinate axis corresponding to the lateral direction (width) of the distance image 30, the Y axis is a co-ordinate axis corresponding to the depth direction of the distance image 30, and the Z axis is a co-ordinate axis corresponding to the vertical direction (height) of the distance image 30. The three-dimensional distribution is generated in the co-ordinates converting unit 30.

Figure 2:
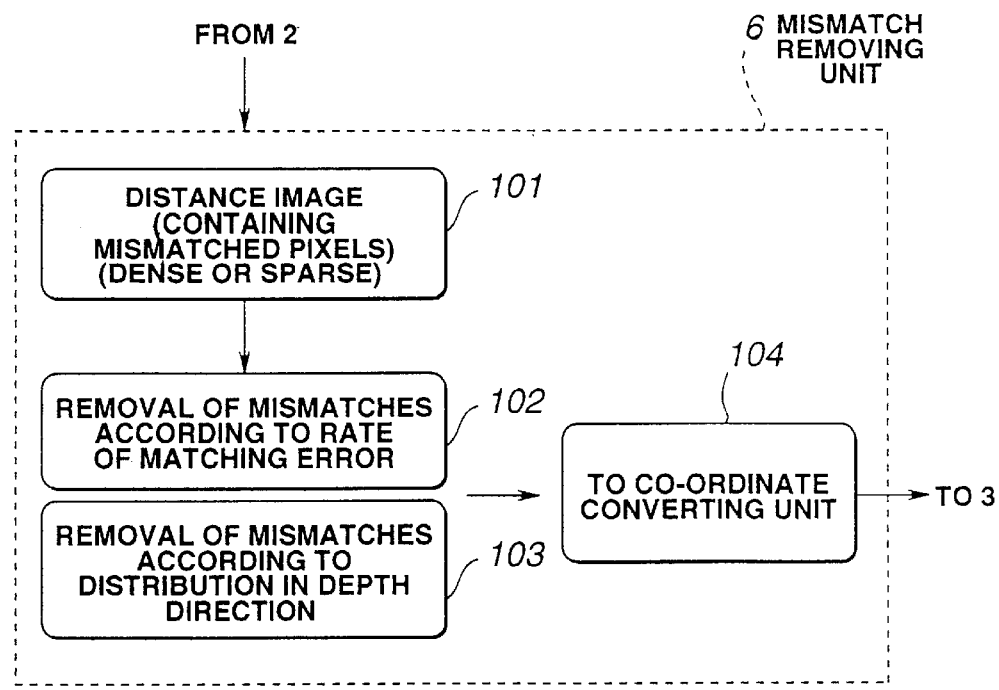
FIG. 2 is a block diagram showing a further embodiment thereof.

FIG. 2 shows an obstacle detector 1 constituted such that a mismatch removing unit 6 for removing mismatches that occur during pattern matching of the distance image 30 (or 4 edge distance image 30') generated by the distance image generating unit 2 is inserted between the distance image generating unit 2 and the co-ordinates converting unit 3.

Here, to describe a mismatch, the distance of each pixel in the image is determined by using a stereo camera (at least two cameras) and matching the pixels in the images captured by the two cameras by means of a pattern matching principle, or the like.

In other words, when attempting to find the distance of a certain prescribed pixel 51 in the image 50A of the images 50A, 50B taken by the two cameras, as illustrated in FIGS. 3(a), (b), the device searches on an epipolar line through the other image B for the pattern which most closely resembles the luminosity (brightness) pattern of the window 52 surrounding that pixel 51 (including the pixel 51), and by determining the corresponding pattern 52' (see FIG. 3(b)), it determines the pixel corresponding to pixel 51 and thereby derives the depth from the parallax thereof.

The matching error E in this case can be determined by the following equation, taking the luminosity value, or the R (red), G (green) and B (blue) values of a pixel w on the image, as G(w) (Ga(w) for one image and Gb(w) for the other image), the position of the pixel within the window, as k, and the parallax, as f, $$E(w)=\Sigma(Ga(w+k)-Gb(w+k+f))(k=1-9) \quad (1)$$

Therefore, when a distance image 30 is generated, the matching error E(w) expressed by equation (1) is stored (see 101 in FIG. 2).

Here, there are often pixels which give rise to a mismatch in the distance image 30, and since the pixels giving rise to mismatches are considered to be in the areas where the matching error E(w) is large, mismatching point removal processing is implemented as shown in FIG. 4 and FIG. 5 with respect to the obtained distance image 30, and pixels having a matching error E(w) equal to or above a prescribed threshold value are taken to be mismatched points and are removed from the distance image 30 (see 102 in FIG. 2).

Specifically, taking the distance image 30 shown in FIG. 4(a) (distance image similar to FIG. 8(a) above) as an example, it is possible to convert the brightness (corresponding to the distance d) of each pixel 40 of the distance image 30 to a table 35 containing numerical values representing distance d, as shown in FIG. 4(b). Moreover, each pixel 40 in the distance image 30 can be converted to a table 36 containing numerical values representing the aforementioned matching error E(w). The larger the numerical value for a pixel 40 in the table 36, the greater the error relating to that pixel during pattern matching, and hence the greater the probability of a mismatch occurring.

Next, a 3 pixel by 3 pixel window 41 is defined, and as shown in FIG. 5(a), processing is implemented whereby the window 41 is successively displaced in the aforementioned tables 35, 36, and the numerical value for distance corresponding to the pixel showing the smallest matching error value in the window 41 at each position is taken as the representative value for that window 41. In this way, a table 37 comprising sets of representative values is created. For example, in the case of the top right window 41' in FIG. 5(a), from the table 35 in FIG. 4(b) and the table 36 in FIG. 4(c), the distance value "9" for the pixel showing the smallest matching error value, "120", is taken as the representative value for that window 41'.

Thereupon, processing is implemented for removing the pixels in the table 37 thus obtained which have a matching error value equal to or above a certain threshold value (150), thereby finally creating a table 38.

In the table 38 thus obtained, the pixels 40 for which no values are shown are taken to be mismatched points and are removed from the distance image 30.

In the foregoing description, pixels having a large matching error are removed by displacing a 3 pixel by 3 pixel window and taking the value corresponding to the smallest error in that window as a representative value, but it is also possible to remove pixels having a large matching error by removing pixels having a matching error equal to or above a prescribed threshold value in the image as a whole.

Next, a further embodiment for removing mismatching points is described with reference to FIGS. 6(a) and (b).

Figures 6A, 6B:
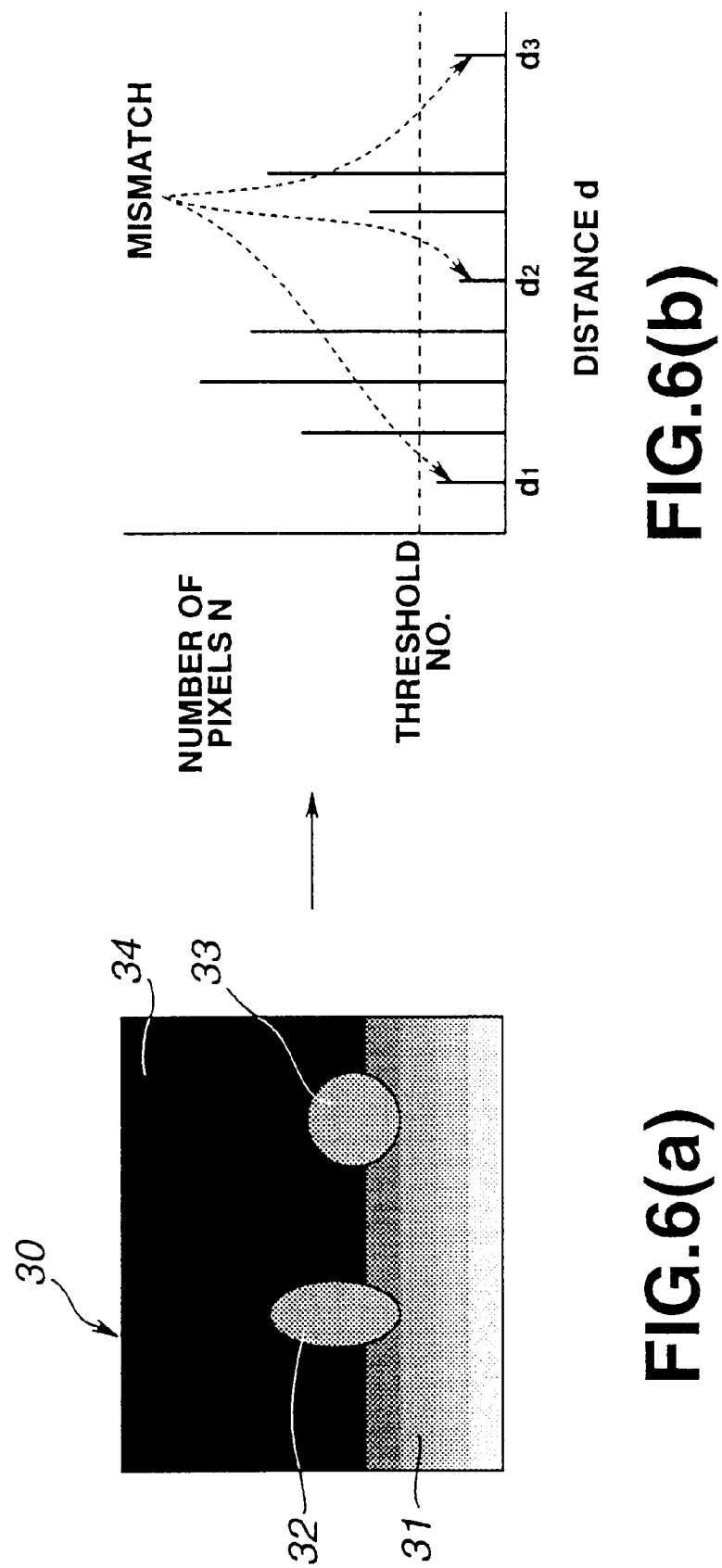
FIGS. 6(a), (b) are diagrams for describing processing for removing mismatched points from a distance image.

FIG. 6(a) shows a distance image 30 similar to those in FIG. 4(a) and FIG. 8(a) described above. Naturally, the processing described below can be implemented similarly using an edge distance image 30' also.

As shown in FIG. 6(b), a graph representing the relationship between the distance d of each pixel 40 in the distance image 30 and the number of pixels N is created on the basis of the aforementioned distance image 30. Here, the obstacles 32, 33, road surface 31, and also the background 34 region form single cohesive objects, and in the case of a single cohesive object, it is expected that the group of pixels in the region covered by that object will have virtually the same value for distance d, and it is expected that the number of pixels showing the same distance d value will be greater than a prescribed threshold value. If, conversely, the number of pixels having the same distance is less than a prescribed threshold value, then these pixels can be judged to be mismatched points, rather than pixels representing a single cohesive object.

On the basis of this finding, as illustrated in FIG. 6(b), the pixels 40 showing distances d1, d2, d3 which have a pixel number N of less than the threshold value NO are taken to be mismatching points and are removed from the distance image 30.

Next, the processing implemented by the land surface detecting unit and obstacle detecting unit 5 in FIG. 1 is described with reference to FIG. 9–FIG. 15.

Figure 10:
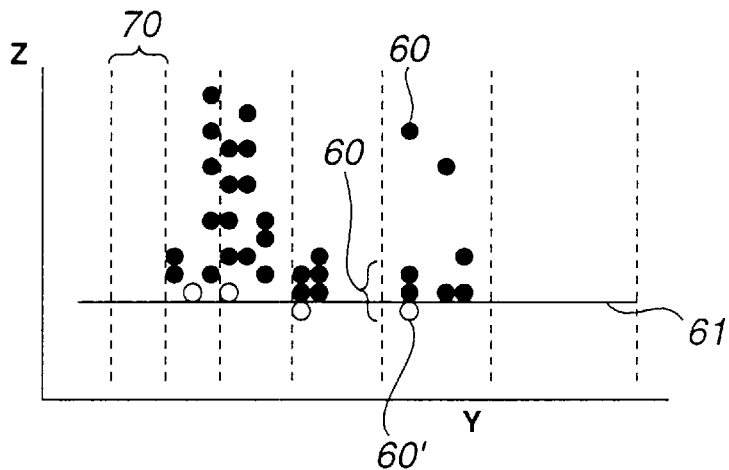
FIG. 10 is a diagram illustrating a manner of converting the three-dimensional distribution in FIG. 9 to a two-dimensional distribution.

As stated previously, when a three-dimensional distribution of pixels 60 is generated by the co-ordinate converting unit 3 (see FIG. 9), the land surface detecting unit 4 implements processing for converting this three-dimensional distribution into a two-dimensional distribution in the depth direction Y and height direction Z, as shown in FIG. 10.

Thereupon, processing is implemented for dividing this two-dimensional distribution at prescribed intervals 70 in the depth direction Y, as indicated by the broken lines, and searching for the pixel 60' representing the bottom point (point having smallest Z value) in each region 70.

A bottom line 61 is generated by using a linear approximation method on the basis of the bottom point pixels 60' thus obtained. This bottom line 61 is then taken as the road surface 31.

In cases where this road surface 31 is not inclined in the direction of the X axis, the road surface 31 can be identified and detected by determining the two-dimensional distribution as shown in FIG. 10 at any point on the X axis.

Figure 11:
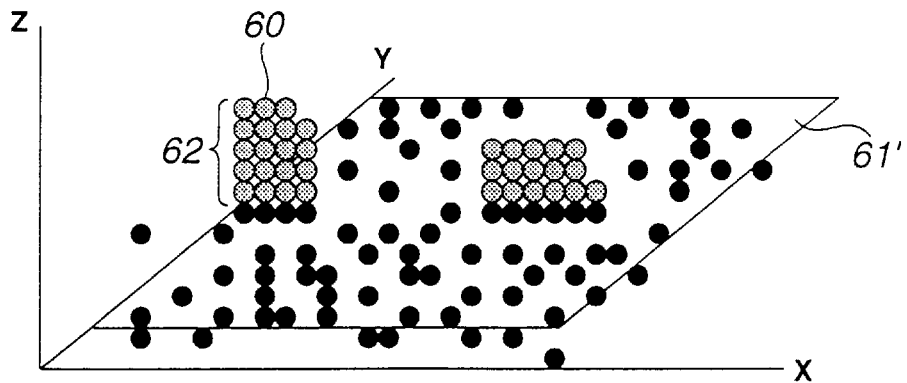
FIG. 11 is an oblique view illustrating a manner of detecting the surface of a road from a three-dimensional distribution.

In cases where the road surface 31 is inclined in the direction of the X axis, bottom lines 61, 61, are derived by determining a two-dimensional distribution as shown in FIG. 10 for each position X on the X axis, and the road surface 31 can be identified and detected by planar approximation of these bottom lines 61, 61, 61,. FIG. 11 is a diagram showing a road surface, which is a bottom plane 61' obtained by means of this method.

Furthermore, if the point of origin of the three-dimensional co-ordinates X-Y-Z lies on the road surface 31, then it is possible to apply restricting conditions indicating that the road surface 31 passes through the point of origin.

Moreover, rather than detecting the road surface 31 on the basis of the bottom points only, the road surface 31 may also be detected on the basis of a group of a number of pixels 60" from the bottom up (see FIG. 10). In short, the road surface 31 can be identified and detected by selecting pixels having a height Z below a prescribed threshold value, from all the pixels in the three-dimensional distribution, and applying a planar approximation to the height data for these selected pixels.

Furthermore, the road surface 31 can also be detected by selecting pixels having a height Z which falls within a prescribed range Z1–Z2, from all the pixels in the three-dimensional distribution, and applying a planar approximation to the height data for these selected pixels. In this case also, if the point of origin of the three-dimensional co-ordinates X-Y-Z lies on the road surface 31, then it is possible to apply restricting conditions indicating that the road surface 31 passes through the point of origin.

In this way, since a road surface is detected from the three-dimensional distribution of pixels, then even if the height of an obstacle and road surface is the same height in a distance image, due to the fact that the moving body is inclined, or the road surface is a slope, for example, it is still possible to identify and detect the road surface 31 readily from other objects.

If a group of pixels 61' corresponding to the road surface 31 is detected on the basis of the three-dimensional distribution of the various pixels, then the obstacle detecting unit 5 determines the distance (height) h of the detected road surface 31 and each of the pixels 60, as illustrated in FIG. 11, and it determines any pixel group 62 which is separated by a prescribed height h0 (for example, 30 cm) or more from the road surface 31 as an obstacle candidate group.

Figure 12:
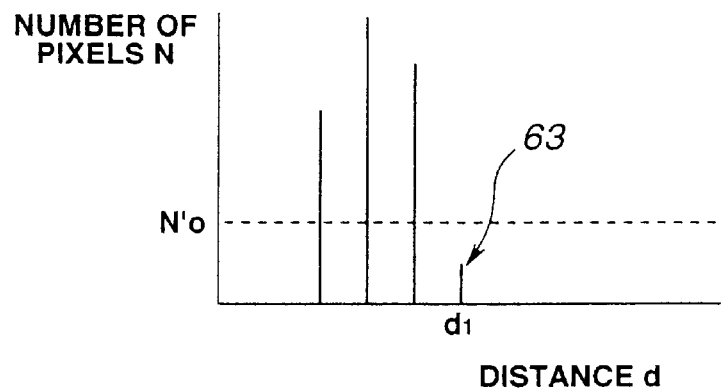
FIG. 12 is a diagram illustrating pixel groups forming obstacle candidates, in the form of the relationship between the distance from a reference point and the number of pixels.

Next, a graph showing the relationship between the distance d from the aforementioned reference point and the number of pixels N is derived for this obstacle candidate point group 62, as shown in FIG. 12.

Here, obstacles 32, 33 are single cohesive objects, similarly to the foregoing description relating to FIG. 6(b), and it is probable that the group of pixels in the region covered by this object will have virtually the same value for distance d and that the number of pixels having this same distance will be greater than a prescribed threshold value. If, conversely, the number of pixels showing the same distance d is equal to or less than the prescribed threshold value, then it can be determined that the points in question are mismatched points, rather than pixels representing obstacles 32, 33 which are single cohesive objects.

On the basis of this finding, as shown in FIG. 12, a group of pixels 63 showing a distance d1 which has a pixel number N equal to or less than a threshold value N'O are regarded to be mismatched points, and these pixels are removed from the obstacle candidate point group 62. Obstacles 32, 33 are then detected from the obstacle candidate point group 62 from which these mismatched points have been removed.

Figure 13:
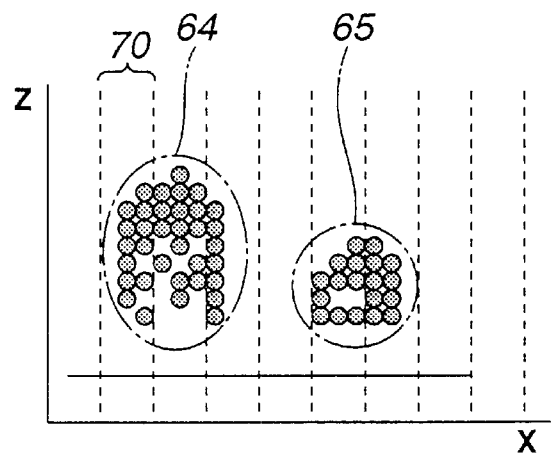
FIG. 13 is a diagram illustrating pixel groups forming obstacle candidates in a two-dimensional distribution.

Specifically, as shown in FIG. 13, processing is implemented for converting the three-dimensional distribution in FIG. 11 to a two-dimensional distribution in the width direction X and height direction Z, with respect to the obstacle candidate point group 62 from which these mismatched points have been extracted.

Here, since the obstacles 32, 33 are single cohesive objects, they are liable to be observed respectively as single cohesive pixel groups in the aforementioned X–Z two-dimensional distribution.

Therefore, on the basis of this finding, the two-dimensional distribution is divided at prescribed intervals 71 in the width direction X, as indicated by the broken lines, and it is investigated whether or not an obstacle candidate point is present in each region 71. Regions in which a obstacle candidate point is present are taken as obstacle candidate regions. It is then investigated whether or not these obstacle candidate regions are consecutive. In this way, all of the obstacle candidate regions which are consecutive in the width direction X are taken as an obstacle regions. In the case of this embodiment, it is probable that two obstacle regions are found, namely, one obstacle region corresponding to the obstacle 32 and a further obstacle region corresponding to the obstacle 33.

Next, in this case, the two-dimensional distribution in the depth direction Y and height direction Z is found, for each of the aforementioned regions 71.

Processing is then implemented similarly for finding obstacle regions in the two-dimensional distribution in each region 71.

In this way, finally, two obstacle regions 64, 65 comprising continuous pixel groups in three dimensions are obtained, and the pixel groups contained in these two obstacle regions 64, 65 are respectively identified and detected as obstacles 32 and 33.

Thereupon, from the pixels 60 constituting the obstacle region 64 thus detected (corresponding to obstacle 32), the three-dimensional co-ordinate position g of a pixel corresponding to a representative point of the obstacle region 64 (for example, the center of gravity) is determined. The maximum length of the obstacle region 64 in the lateral direction is then derived as "width a". The maximum length of the obstacle region 64 in the direction perpendicular to the width a is derived as "depth c". And the maximum height of the obstacle region 64 is derived as "height b". Similar processing is then implemented for the other obstacle region 65. Incidentally, the representative point of the obstacle regions 64, 65 may be taken as the center point of the foremost face thereof.

Figure 14:
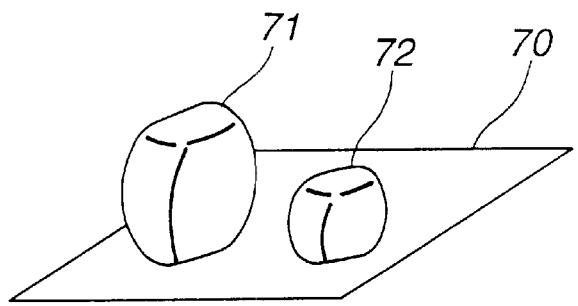
FIG. 14 is an oblique view showing a manner of displaying a three-dimensional distribution on a display section, as a detection result for a road surface and obstacles.

In this way, when the land surface detecting unit 4 detects the road surface 31 as a pixel group 61', and the obstacle detecting unit 5 detects obstacles 32, 33 as pixel groups 64, 65, then on the basis of these detection results, the display unit 7 generates a three-dimensional image 70 corresponding to the road surface 31, and it also generates three-dimensional images 71, 72 corresponding to the obstacles 32, 33, as illustrated in FIG. 14, these three-dimensional images being displayed on the same screen.

Figures 15, 16:
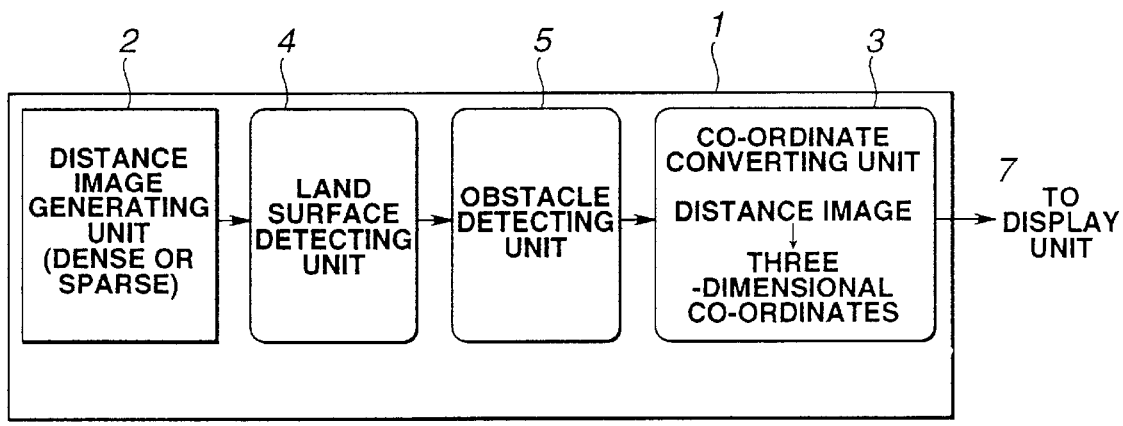
FIG. 15 is a diagram illustrating a manner of displaying the dimensions and representative position of each object, as a detection result for a road surface and obstacles.
FIG. 16 is a block diagram showing a further embodiment of an object detector relating to the present invention.

Additionally, the values for the width a, height b, depth c and representative point g of the obstacles 32, 33 calculated above are displayed on the aforementioned display unit 7, as illustrated in FIG. 15.

The embodiment described above is devised in such a manner that a road surface and obstacles are detected after a distance image has been converted into a three-dimensional distribution of pixels, but as shown in FIG. 16, it is also possible first to detect the road surface and obstacles directly from the distance image, and then to convert the distance image to a three-dimensional distribution and display the road surface and obstacles within this three-dimensional distribution.

In other words, when a distance image is generated by the distance image generating unit 2 in FIG. 16, the land surface detecting unit 4 calculates and detects a group of pixels representing the road surface, from all of the pixels in this distance image, and the obstacle detecting section 5 calculates and detects as obstacles any groups of pixels that are separated from the detected road surface by a prescribed height or more. Thereupon, on the basis of two-dimensional co-ordinate position data (i,j) and distance data d for the pixel groups corresponding to the detected road surface and obstacles, the co-ordinates converting unit 3 generates a three-dimensional distribution of the pixel group corresponding to the road surface and the pixel groups corresponding to the obstacles, and the display unit 7 displays a three-dimensional image of the road surface and obstacles, etc. on the basis of the three-dimensional distribution thus generated.

INDUSTRIAL APPLICABILITY

The present embodiment supposes a case where obstacles are detected on the road of travel of a moving body such as an unmanned dump truck, but the present invention may be applied in any installation and in any industrial field, where objects present in a plane are to be detected, such as external inspection of products located on an inspection stand, or the like.

What is claimed is:

1. An object detector comprising distance image generating means for measuring a distance from a reference position to an object to be detected present on a plane and generating a distance image of the plane and the object to be detected, and detecting means for detecting the object on the plane by using the distance image generated by the distance image generating means, wherein the object detector comprises:

three-dimensional distribution generating means for calculating three-dimensional co-ordinate position data in a three-dimensional co-ordinates system, for each pixel of the distance image, on the basis of two-dimensional co-ordinate position data for each pixel of the distance image and distance data from the reference position for each of the pixels, dividing a two-dimensional distribution in a depth direction Y and a height direction Z at prescribed intervals and selecting bottom point data thereof, on the basis of the calculated three-dimensional co-ordinate position data for each pixel, determining the plane by planar approximation of the height indicated by the three-dimensional co-ordinate position data for the selected pixels, and generating a three-dimensional distribution of pixels corresponding to the object to be detected; and wherein the detecting means detects groups of pixels having a prescribed height or more with reference to the determined plane as the object to be detected.

2. The object detector according to claim 1, characterized in that the object to be detected on the plane is an obstacle on a surface of a road on which a moving body is travelling.

3. The object detector according to claim 1, characterized in that the distance image generating means generates the distance image by matching corresponding points of two images captured by two cameras, and when the three-dimensional distribution is generated by the three-dimensional generating means, pixels in the distance image obtained previously from the distance image generating means which show a matching error for the matching operation that is equal to or above a prescribed threshold value are regarded to be mismatched points and are removed.

4. The object detector according to claim 1, characterized in that when the three-dimensional distribution is generated by the three-dimensional distribution generating means, a relationship between a distance and number of pixels is determined for the distance image previously obtained from the distance image generating means, and pixels having a distance for which the number of pixels is below a prescribed threshold value are regarded to be mismatched points and are removed.

5. The object detector according to claim 1, characterized in that the distance image generating means generates the distance image of the object to be detected including a surface of the object, and when the three-dimensional distribution is generated by the three-dimensional distribution generating means, an edge distance image of the object to be detected representing only edges of the object is obtained by differential processing of the distance image previously obtained from the distance image generating means, and the three-dimensional distribution is generated by using the edge distance image.

6. The object detector according to claim 1, characterized in that the distance image generating means generates an edge distance image of the object to be detected representing only edges of the object, and the three-dimensional distribution generating means generates the three-dimensional distribution by using the edge distance image.

7. The object detector according to claim 1, characterized in that the three-dimensional distribution generating means selects, from all the pixels, those pixels having a height equal to or below a prescribed threshold value on the basis of the calculated three-dimensional co-ordinate position data for each pixel, and determines the plane by planar approximation of the height indicated by the three-dimensional co-ordinate position data for the selected pixels.

8. The object detector according to claim 1, characterized in that the three-dimensional distribution generating means selects, from all the pixels, those pixels having a height within a prescribed range, on the basis of the calculated three-dimensional co-ordinate position data for each pixel, and determines the plane by planar approximation of the height indicated by the three-dimensional co-ordinate position data for the selected pixels.

9. The object detector according to claim 1, characterized in that, on the basis of a three-dimensional distribution representing the three-dimensional distribution of each pixel, the detecting means determines a group of pixels corresponding to the plane, whilst also determining groups of pixels separated by a prescribed height or more from the plane thus determined as detected object candidate point groups, determining a relationship between distances from the reference position and numbers of pixels, with respect to these detected object candidate point groups, regarding pixels of a height for which the number of pixels is equal to or less than a prescribed threshold value as mismatched points and removing same, and detecting the object to be detected from the detected object candidate point groups from which the pixels at these mismatched points have been removed.

10. The object detector according to claim 1, characterized in that the three-dimensional distribution is a distribution of each pixel in a height direction, a width direction and a depth direction; and the detecting means determines a group of pixels corresponding to the plane, whilst also determining groups of pixels separated by a prescribed height or more from the plane thus determined as detected object candidate point groups, determining a relationship between co-ordinate positions in the width direction and co-ordinate positions in the height direction and a relationship between co-ordinate positions in the depth direction and co-ordinate positions in the height direction, with respect to these detected object candidate point groups, and detecting that groups of pixels which exist continuously in the width direction or depth direction on the basis of these relationships are the object to be detected.

11. An object detector comprising distance image generating means for measuring a distance from a reference position to an object to be detected present on a plane and generating a distance image of the plane and the object to be detected, and detecting means for detecting the object on the plane by using the distance image generated by the distance image generating means, wherein the object detector comprises:

object detecting means for detecting groups of pixels separated by a prescribed height or more from the plane thus calculated as the object; and three-dimensional distribution generating means for generating a three-dimensional distribution of pixels corresponding to the plane and the object to be detected by calculating three-dimensional co-ordinate position data in a three-dimensional co-ordinate system for groups of pixels, on the basis of two-dimensional co-ordinate position data for the groups of pixels corresponding to the object as detected by the object detecting means and the distance data from the reference position, dividing a two-dimensional distribution in a depth direction Y and a height direction Z at prescribed intervals and selecting bottom point data thereof, on the basis of the calculated three-dimensional co-ordinate position data for each pixel, and determining the plane by planar approximation of the height indicated by the three-dimensional co-ordinate position data for the selected pixels.

12. The object detector according to claim 11, characterized in that the object to be detected on the plane is an object on the surface of a road on which a moving body is travelling.

* * * * *